C. B. CANNON.
POTATO DIGGER.
No. 60,618.
Patented Dec. 18, 1866.
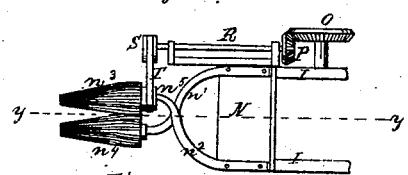
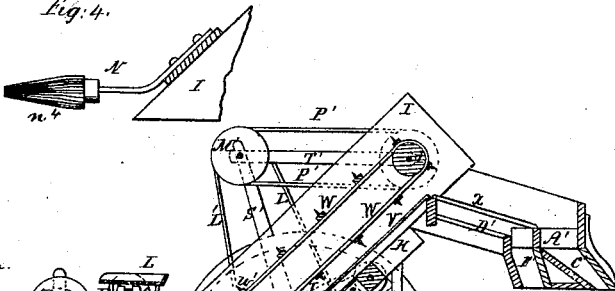
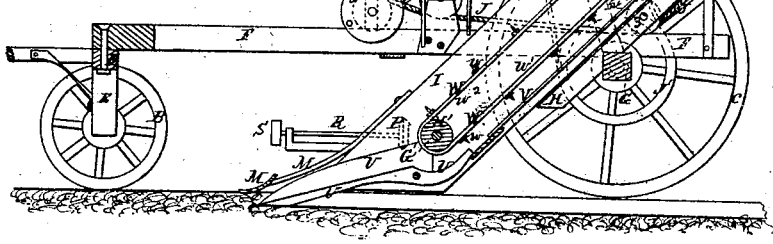
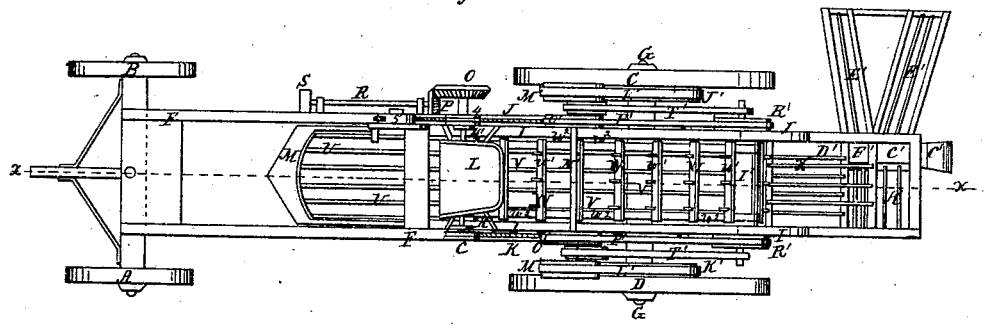
Witnesses:
Jas. A. Lurie
J. W. R. Covington
Inventor;
Chas. B. Cannon
Per Munn & Co
Attorneys

United States Patent Office.

IMPROVEMENT IN POTATO DIGGER.

CHARLES B. CANNON, OF KEOKUK, IOWA.

Letters Patent No. 60,618, dated December 18, 1866.

The Schedule referred to in these Letters Patent and making part of the same.

TO ALL WHOM IT MAY CONCERN:

Be it known that I, CHARLES B. CANNON, of Keokuk, Lee county, State of Iowa, have invented a new and useful Improvement in Potato Digger; and I do hereby declare that the following is a full, clear, and exact description thereof, which will enable others skilled in the art to make and use the same, reference being had to the accompanying drawings, forming part of this specification, in which—

Figure 1 is a top or plan view of my improved potato digger.

Figure 2 is a vertical longitudinal section of the same, taken through the line $x\,x$, fig. 1.

Figure 3 is a top view of the device for pulling the potato stalks.

Figure 4 is a vertical section of the same, taken through the line $y\,y$, fig. 3

Similar letters of reference indicate like parts.

My invention has for its object to furnish a machine by means of which potatoes may be dug, separated from the dirt, and sorted, the larger and smaller ones being deposited in separate compartments in a wagon or cart body; and it consists of a potato digger, the various parts of which are constructed and arranged as hereinafter more fully described.

A, B, C, and D are the wheels upon which the machine is carried. The axle E, to which the wheels A and B are attached, is pivoted to the forward end of the frame F by a bolt, as shown in figs. 1 and 2, so that the machine may be turned at right angles, when desired. The rear end of the frame F rests upon the rear axle G, as shown in fig. 2. H is a frame attached to the axle G and to the frame F and extending up at an angle of about thirty-five or forty degrees. Along the upper side of this frame slides the elevator box I, which is kept in place by pins passing up through the frame H, and entering grooves formed in the lower edge of the box I. The box I is supported by the bands J and K. One end of the band J is attached to the side of the box, as shown at 1, fig. 2; thence it passes around a pulley, 2, attached to the side of the frame H; thence around the pulley 3, attached to the side of the frame H, just above the frame F; thence it is carried forward and passes around the pulley 4, and its other end is attached to the pulley 5. The other band, K, is arranged in precisely the same manner, except that its forward end is attached to the pulley 6. It will be observed that the pulleys 4 and 6 are attached immovably to the same shaft, so that, as the one is revolved, the other must revolve with it. The pulley 5 is furnished with a crank-pin, so that the driver, in his seat L, can operate the said pulley, and raise or lower the box I at pleasure. To the forward upper edge of the box I is attached a knife or scraper, M, which, as the machine advances, slices or scrapes off the dry stalks and surface dirt, so that the action of the fork may be unobstructed. When the potato stalks are green, the knife M should be replaced by the puller N, upon the projecting arms $n^1\,n^2$, on which revolve two cone-shaped fluted wheels, $n^3\,n^4$. These wheels draw the stalks from the ground and draw them to each side of the machine, leaving the ground free for the action of the fork. To one end of the shaft G' is attached a bevel gear-wheel, O, into which meshes a bevel gear-wheel, P, attached to one end of the shaft R. This shaft revolves in bearings attached to the side of the box I, and to its other end is attached a pulley S, around which passes a band T, which also passes around a pulley, $n^5$, attached to the cone-shaped wheel $n^3$, as shown in fig. 3. By these means motion is communicated to the cone-shaped wheels $n^3$ $n^4$. The prongs U are supported by a bar passing across the lower end of the box I, as seen in fig. 2, and their rear ends are connected with the lower end of the screen V. It will be observed that the side prongs are considerably wider than the others, so as to act as guides to the potatoes as they pass back. It will also be observed that the rear part of the prongs U are curved so as to form a depression or cavity, into which the potatoes pass, and from which they are taken by the carriers W. The carriers W are formed by attaching wooden bars $w^1$ to endless belts $w^2$. The bars $w^1$ are furnished with projecting pins, as seen in figs. 1 and 2. These pins take the potatoes from the depression in the prongs U and carry them up the inclined screen V, which allows the dirt to fall through it. From the screen V they pass to the descending screen X, down which the larger potatoes pass into the chamber A', from which they pass into a compartment of the wagon or cart body prepared for their reception, through the spout B' or C', according as the said wagon or cart is placed at the side or rear of the machine. The smaller potatoes fall through the screen X upon the screen D', down which they pass, and go thence to a separate compartment prepared for their reception in the wagon or cart body, through the spout E' or F', according as the said cart is placed at the side or rear of the machine. The endless belts $w^2$ of the carriers W may be replaced by endless chains, if desired, the links being so formed as to fit upon the cylinders H′ and I′, the bars $w^1$ being attached to the links of said chains. To the spokes of the wheels or rims C and D are attached wheels J′ and K′, around which pass bands L′, which also pass around the pulleys M′. The pulleys M′ are rigidly attached to the shaft N′, to which shaft are also attached the pulleys O′. P′ are bands passing around the pulleys O′, and the pulleys R′ attached to the projecting ends of the shaft that carries the cylinder I′. The shaft N′ is supported by a toggle-joint, so that at whatever elevation the box I may be, the bands L′ and P′ may always be kept taut, so as to transmit motion from the wheels C D to the carriers W. Each of the toggle-joints which supports the shaft N′ is formed by two bars S′ and T′. The lower ends of the bars S′ are connected with and supported by the axle G, and the ends of the bars T′ are supported by the shaft that carries the pulleys R′, and cylinder I′, as shown in figs. 1 and 2.

I claim as new, and desire to secure by Letters Patent—

An improved potato digger, consisting of the fluted wheels $n^3$ $n^4$, the prongs U, the carrier W, and screens V, the various parts of which are constructed, arranged, and operated substantially as herein described, and for the purpose set forth.

CHARLES B. CANNON.

Witnesses:
L. B. MALTBY,
JOHN A. BISHOP.